(12) United States Patent
Maples et al.

(10) Patent No.: US 6,381,585 B1
(45) Date of Patent: *Apr. 30, 2002

(54) METHOD AND APPARATUS FOR ADMINISTERING A SHARE BOND

(76) Inventors: Durham Russell Maples, 1507 Park Cir., Camden, SC (US) 29020; Herman Russell Anderson, 1113 Second St., Gulfport, MS (US) 39501

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/071,878

(22) Filed: May 4, 1998

(51) Int. Cl.[7] .............................................. G06F 17/00
(52) U.S. Cl. ........................................... 705/36; 705/35
(58) Field of Search ...................................... 705/36, 35

(56) References Cited

U.S. PATENT DOCUMENTS

| | | | | |
|---|---|---|---|---|
| 4,093,276 A | * | 6/1978 | Debe | |
| 4,953,085 A | * | 8/1990 | Atkins | 705/36 |
| 5,214,579 A | * | 5/1993 | Wolfberg et al. | 705/36 |
| 5,592,379 A | | 1/1997 | Frinfrock et al. | |
| 5,692,233 A | * | 11/1997 | Garman | 705/36 |
| 5,758,097 A | * | 5/1998 | Debe et al. | 705/35 |
| 5,819,238 A | * | 10/1998 | Fernholz | 705/36 |
| 5,893,079 A | * | 4/1999 | Cwenar | 705/36 |
| 5,915,209 A | * | 6/1999 | Lawrence | 455/31.2 |
| 5,946,667 A | * | 8/1999 | Tull et al. | 705/36 |
| 6,112,188 A | * | 8/2000 | Hartnett | 705/35 |

FOREIGN PATENT DOCUMENTS

JP 411213257 A * 8/1999

OTHER PUBLICATIONS

Tax Code: Determination of amount of original discount—Title 26, Subtitle A, Chapter 1, Subchapter P, Part V, Subpart A, Section 1273, (c) (2), (b) (5).

Tax Code: Other definitions and special rules—Title 26, Subtitle A, Chapter 1, Subchapter P, Part V, Subpart A, Section 1275, (a) (4).

Tax Code: Stapled Entities—Title 26, Subtitle A, Chapter 1, Subchapter B, Part II, Section 269b.

Teweles, Richard and Bradley, Edward: The Stock Market. Fourth Edition 1987. p. 12–36, 445–449. John Wiley & Sons, New York, NY U.S.A.

Woelfel, Charles: The Dictionary of Banking. 1994 p. 6, 10, 96, 137, 138, 154, 229. Probus Publishing Company. Chicago, IL U.S.A.

Bruck, Connie: The Predator's Ball. 1988 p. 37–38, Benguin Group. New York, NY U.S.A.

(List continued on next page.)

Primary Examiner—James P. Trammell
Assistant Examiner—Pierre E. Elisca (57) ABSTRACT

A method and apparatus for enhancing the stock of a business entity by joining the shares of stock to non-investment bonds at no cost, no loss financially to any current and/or future shareowner with any principal or issue price is zero, unpaid or paid by any means other than any current and/or future shareowner paying any money or property for the bonds. The enhancement that is derived from this joining is called a Share Bond (28) which has increased investment security, guaranteed monetary benefits for the shareowners that are administered by the data processing system provided by the invention. This includes the joining, updating of information, calculating payments and distribution of the Share Bond benefits.

5 Claims, 6 Drawing Sheets

Microfiche Appendix Included
(3 Microfiche, 66 Pages)

OTHER PUBLICATIONS

Train, John: The Midas Touch. 1987 p. 75–78, Harper & Row. New York, NY U.S.A.

Munn, Glenn/Garcia Ferdinand: Encyclopedia of Banking and Finance 1973, p. 498. Banker's Publishing Company. New York, NY U.S.A.

Derwent–ACC–NO: 2001–451173; Anderson C. F. et al, Feb. 2001.*

"IRS should study reporting requirement for tax–exempt interest income, GAO say", Dialog(R) file, 790, Access No. 00166352, Dec. 1988.*

Cheng, LI–LAN;The motives, timing and subsequent performance of seasoned equity issues;vol. 56/12–A of Dissertation Abstracts International p. 4864, 1995.*

Welsh, Tricia; "Coping with the new law", Fortune, v128 n10, pp: 173–174, 1993.*

Retkwa, Rosalyn; "Reconstructuring the balance sheet: Shrewd rebuilding cuts debt cost, opens doors to opportunity", Corporate Cashflow, v13 n13 pp:20–28, Dec. 1992.*

Weberman, Ben: "Why tax–exempts are vulnerable now", Forbes v121 n5 pp:104, Mar. 6, 1978.*

Pare, Terence P; "What the flat tax means to investors", Fortune, v131 n11 pp:50–51, Jun. 12, 1995.*

PR Newswire, Moody's investors service morningstar, knight ridder financial and two pacific northwest municipal bond underwriters added to bonds online cyber network–www.bondsonline.com, Jun. 12, 1996.*

Product name: Telescan portfolio manager 2.1 (287733), Dialog File 256, Access No. 01287733.*

Wall Street Journal, "IRS issues rules on restrictions on private–activity bonds", mon ed, col 4, pB3(w), Jan. 13, 1997.*

Birnbaum, Jefferey, Wall Street Journal, "Survival of overhauling tax code", Mon ed, col 1, p44(w) p48(E), Oct. 28, 1985.*

William Michael Grant, Futures contracts, capital income taxation, and corporate debt policy (taxation), Dialog File 35, Access No. 0150228, 1992.*

Uppal, Jamshed Yunas, "An empirical investigation of debt and taxes in a multiperiod framework (capital structure)", Dialog File 35, Access No. 01109726, 1989.*

Schenkerman, S.; "Capital structure under personal income taxes", Dialog File 2, Access No. 01888009, Nov. 1981*

Chang, Chun; "Contractual models of the firm: A financial theory", Dialog File 35, Access No. 0967857, 1987.*

303F.2d620; 1962U.S.App.

Universal Casting Corp. V. Commissioner of Internal Revenue 37 T. C. 107: 1961 U.S. Tax Court, Oct. 31, 1961 P. 1 syllabus.

Starwood Lodging 424B2.

US Tax Code, Sec. 149 (a) (3) (A) ,Book entries permitted.

Preferred Share Purchase Rights, Federal–Mogul Corporation, Rights Agreement, Paragraph 3, Lines 10–11; Paragraph 4, Lines 1–2.

US Tax Code, Sec. 385, Treatment of certain interests in corporations as stock or indebtedness, Factor (1).

* cited by examiner

METHOD AND APPARATUS FOR ADMINISTERING A SHARE BOND

STATEMENT REGARDING FEDERALLY SPONSORED RESEARCH OR DEVELOPMENT

Not Applicable.

REFERENCE TO A MICROFICHE APPENDIX

Total microfiche are 3 and total frames are 66.

FIELD OF INVENTION

This invention relates to the field of financial securities for enhancing the stock of a business entity and, in particular, to the joining of non-investment bonds to shares of that stock accomplished by a program that processes the complete joining including of information, payments and distributions.

BACKGROUND

A business entity or company faces daily challenges in their efforts to make their shares of stock increasingly more valuable. These companies have compelling reasons for wanting to enhance their stock's value. The first is that the company can issue more shares for sale to raise money for company operations and not go into debt to do so. The second reason is so the company can reward the shareowners who profit when the shares increase in price. Pleasing the shareowners is important since they are the voters that will decide who directs and runs the company. Keeping shareowners happy and stock prices high are also invaluable in helping to prevent a proxy fight or hostile takeover. This helps the CEO and other top executives to maintain their jobs since takeovers often lead to the removal of the CEO and those executives.

While the above situations can make the stock price rise dramatically, shareowners will often sell the entire stock in a company at a price that is far less than the worth of the company's assets. A profit is realized in the short term but is often less than the long term profit potential.

Enhancing the stock does not always mean the stock price will increase because other factors are always at work where stock prices are involved. Still enhancing the stock could help keep the price stable and avoid a stock price plunge in financially hard times, thereby preventing the picture-perfect climate for a hostile corporate takeover. Therefore stock enhancement provides benefits for the CEO, executives and shareowners.

The best and most efficient way to enhance the stock is by rewarding the shareowners as much and as directly as possible. Normally a company has three main ways of rewarding their shareowners. The first way is to use the profits of the company to invest in the company operations to increase profits in the future. This decreases the corporate taxes but does little for the shareowners. The second way is for the company to use the profits to buy back some of its own shares of stock, but this means that the shareowners who sell do not benefit from any price increase that may follow. The shareowners who sell also are unable to benefit from the larger dividends that are usually paid since there are now fewer shares to be paid from the corporation's dividend pool. Even if the company buys a percentage of stock from each shareowner, the I.R.S. considers this a dividend and the amount is taxable at the corporate level. The third and most direct way of rewarding shareowners is by paying dividends to the shareowners. The problem with dividends is that they are included in the corporate revenue when paid, therefore are taxed at the corporate level and again by the capital gains tax. This double taxation on the same money reduces the money the shareowners receive. Current corporate tax rates are from fifteen to thirty-four percent with companies paying thirty-four percent on any profit over $75,000.

In spite of this large tax burden, many companies will still pay dividends out of the profits. Other companies will invest in company operations, buy other companies, pay executives large amounts of money, pay for expensive executive luxuries or use a combination of the four to avoid making a profit, and then pay dividends by either borrowing money or paying the dividends from the company savings. This practice becomes a temporary fix since savings not replenished with profits which are subject to tax, will eventually be exhausted. Continuing to borrow, if not supported by increased revenues, will eventually collapse under the debt burden like a house of cards. Still this is often done because the tax burden is so great, and yet the rewarding of shareowners to enhance the stock is so necessary.

The present methods and system are burdened with tremendous inefficiencies. The current environment leads many companies to abandon stock enhancement. These companies instead focus on using profits to expand the company and reward top executives. Instead of paying out money to the I. R. S. and shareowners, they often make poor acquisitions and CEO'S live like kings. If the company begins to suffer financially, they lay-off employees to increase profits and repeat the process. In the meantime the shareowners receive little or no dividends since dividends are not guaranteed. The stock price drops or becomes stagnant.

There have been some attempts to reward shareowners by using the debt-favoring provision of the U.S. tax laws: interest on bonds is deductible but dividends on stock are not. The financial bonds would be issued directly to the shareowner assuming roughly a thirty-four percent corporate-income-tax rate. A company that can pay shareowners a rate of nine percent on dividends can just as easily pay twelve percent interest on debt because it can deduct the interest. This solution is effective in the short term but a big problem arises immediately after the shareowners sell the stock but retain the bonds. The new shareowners will not receive the bond interest so they will find dividends sparse and soon falling stock prices. This will cause many corporate management problems since to continue to sell new bonds to all the new shareowners would send the company into bankruptcy. Even though the company receives money from the bond sales, the debt could collapse the company. Still the deductible interest on bonds is a beneficial component of any stock enhancement method or program.

There are a variety of financial bonds and their sole purpose is to to raise money for the institution that sells or issues the bonds. Bonds are generally considered to be investment securities that differ from stock in that bonds usually have guaranteed interest payments which are paid before dividends on stock. However, there are exceptions. Adjustable-rate convertible debt is a bond with no conversion premium and a coupon (interest) equivalent to or tied to the dividend on the underlying common stock. This convertible bond or note has a variable (floating rate) coupon by reference to a standard index rate. The guaranteed interest payment that exists with most bonds is a beneficial component of any stock enhancement method or program.

Bonds are more secure than stock because failure to pay interest or the principal amount on the bonds could legally force the company into bankruptcy. Stocks are more speculative. In the case of a corporate liquidation, the bondowners are in line to be paid before the stockowners. The corporate assets are usually distributed among those owed wages, holding loans, bonds and the end-of-the-line stockowner could receive nothing. The increased investment security of a bond is a beneficial component of any stock enhancement method or program.

Convertible bonds are presently the closest form available by which most of the afore mentioned enhancement elements of a bond are in some way tied to stock. A convertible security is one that permits the holder, at his or her option and under certain conditions, to exchange an issue for another security. Usually a convertible bond may be exchanged for common stock in the same company, but there are some exceptions in which the holder may receive preferred stock and others in which the security received is an issue of another company. Holders of a convertible security may exercise this option of exchange for a profit, increase yield, avoid a call, or for any other reason they believe valid. The problem with a convertible bond is that it is an either or proposition. The combined benefits are not exercised or capable of being utilized simultaneously. Once the bond converts to stock, the benefits associated with the bond disappear. When the bond portion of the security is in effect, the benefits that are usually associated with stock such as voting rights, possible stock price increases, possible stock splits and possible dividends are not available prior to conversion.

The best stock enhancement should retain the best elements of stock while adding other benefits. An example of an attempt to do this can be found in a corporate structure called pair-shared REIT'S(Real Estate Investment Trusts) or stapled entities. This structure links a share in a real estate investment trust, which is exempt from taxes at the corporate level, with a share in an operating company that can generate income other than rents and mortgages. The shares are paired to trade together as one unit. The problem with this structure is that it is confined to real estate investment trusts and Congress prohibited the structure from tax-exemption status in 1983. In the tax code Title26, SubtitleA, Chapter1, SubchapterB, PartII, Section269b, it is stated that stapled entities shall be treated as one entity with entity being defined as any corporation, partnership, trust, association, estate or other of carrying on a business activity. A handful of these pair-shared REIT'S were grandfathered in and today their stock value has increased greatly. So much so, that one of the existing pair-shared REIT'S just bought a major corporation (ITT) for billions in stock and cash while generating less than a half billion dollars in revenue. This demonstrates the potential power of true stock enhancement particularly when you consider that the pair-shared REIT'S pay most all profits out to the shareowners in dividends that are not double taxed on those profits.

A slightly different corporate structure is generally referred to in the tax code in two other sections. In Title 26, Subtitle A, Chapter 1, Subchapter P, Part V, Subpart A, Section 1273, it is stated in (c)(2) Treatment of investments—"in the case of any debt instrument and an option, security, or other property issued together as an investment unit." This shows a bond and a stock can be joined. In the same section (b)(5), Property is defined to include services and the right to use property, but such term does not include money which is relevant when coupled with Title 26, Subtitle A, Chapter 1, Subchapter P, Part V, Subpart A, Section 1275, (a)(5) which states—"any debt obligation of a corporation distributed by such corporation with respect to its stock shall be treated as if it had been issued for property." The two statements together refer to a bond (debt obligation) distributed with respect to its stock (joined to stock) will be treated for tax purposes as if it had been issued for property. This does not include money. There is no reference to any bond being issued with respect to the corporations stock that has been issued for property or money, only that for tax purposes will be treated as if it had been issued for property. In fact all references to a bond in the code are made to the effect that the bond must be issued for something in terms of money or property. The reason is that all bonds have previously only been considered and used as investment securities. Investment securities in the financial reference literature are defined as generally, all classes of bonds and stocks, regardless of quality. Therefore any bond issued in an investment unit would be considered an investment security since all classes of bonds are investment securities. To have a bond in such a unit to be considered a non-investment security would require a specific stated issue price of zero for that bond. Without that specific statement any reasonable mind must conclude that some money or property was given, by the stockowner, as an issue price for that bond. To have had one price for the entire unit does not automatically lead to the conclusion that the bond issue price is zero and the payment is allocated to the stock. Both are considered investment securities which by definition requires an investment, of money or property, from the individual or entity that will receive benefits from the bond. There have been no references made to a bond being issued and joined to stock already outstanding. No reference has been made to such bonds being issued and joined to stock for no money or no property. therefore costing the owners of the stock nothing.

The concept of joining non-investment bonds to stock is a new and important aspect of any stock enhancement method or program. The stock enhancement is much more effective if the shareowners pay nothing for the bonds. Any stock enhancement should have the best elements of both stocks and bonds. To add the best elements of bonds to the best elements of stocks, and at no cost to the shareowner, will create a great demand for the stock. The price of the stock will increase which will make both the shareowners and corporate management happy. Shareowners make more money from their stock investments. Corporations can sell or trade stock and get more money or assets for the same shares. This will decrease the chances of corporate takeovers in that the company is too big or it's stock is too expensive. Therefore, what is needed is a means to provide a combination of all these elements that can be exercised simultaneously with any business operation under the current tax law.

SUMMARY OF INVENTION

Accordingly several objects and advantages of my invention are to provide stock enhancement of a business entity under current tax law. To join non-investment bonds to the stock would add investment security and guaranteed corporate tax deductible payments. The potential price growth of the stock, possible splits of the stock, possible dividends, any voting rights of the stock would be retained by the shareowners. The cost to the shareowners would be only the price of the stock and nothing for the bond.

The invention is a method and apparatus for joining non-investment bonds to the shares of a business entity that is in treasury or is outstanding. Hence the title of the invention is a Share Bond which can enhance all types of stock from all types of business operations.

Share Bonds are joined to newly issued or outstanding shares of stock of a business entity or corporation by using a data processing system specifically designed for such purpose. The data processing system also provides separate data processing systems for updating and storing data, as needed, while a data processing system for payment and distribution is transferred to the corporation. This is important because corporations do not like to have their shareowners names publized. The data processing system also provides a certificate and a written agreement that sets forth the terms of the Share Bond to all shareowners, and the corporation has an understanding to honor those terms despite any or no acceptance from the shareowners. Basically, the shareowners do next to nothing and receive all the benefits. The only obligation the shareowners have is to own the stock and make certain the corporation knows that they own the stock so the checks get to the proper place. This is important because those checks could be larger than the dividend check would have been since the interest on the Share Bond will be deducted from the corporations revenue before taxes are calculated, thereby saving as much as thirty-four percent for corporations making a profit over $75,000. The shareowner can still receive dividends but they will not be guaranteed like the Share Bond interest payments are.

Share Bonds provide the greatest investment security when joined to shares of common stock since common stockowners are the last to receive money in a corporate liquidation. With Share Bonds these shareowners could be classified as senior debt, but subordinated debt still pays them before any ordinary shareowner gets anything. Guaranteed payments add to this greater investment security.

Once Share Bonds are on the market, corporations will make more funds available to pay the interest and the face value on the new Share Bonds. Less will be spent on those high executive compensations, luxury corporate jets, and other unnecessary corporate spending. Currently a great deal of business practices are done to avoid taxes by not paying dividends but Share Bonds can change corporate behavior in favor of shareowners. Most estimates are four out of ten Americans, most small investors, own stock. Share Bonds will give approximately one hundred million Americans the opportunity to receive fifteen to thirty-four percent more money annually from their stock investment, even if profits and corporate behavior remain exactly the same.

The Federal government can still tax the Share Bond interest payments at the capital gains tax rate, and there will be more to tax. This will leave most shareowners with about twenty-seven percent more money after taxes than is currently the case. Once this happens the issuance of Share Bonds will incease dramatically and cause stock void of Share Bonds to become devalued if not obsolete.

A secondary non-enhancement aspect of Share Bonds is that a business entity, if the accrual method of accounting is used, will be able to amortize the cumulative face value of all the Share Bonds over the maturity term of the bonds. That is, if the Share Bonds have a cumulative face value of ten million dollars and a ten year maturity the business entity deducts a million dollars a year for ten years from their corporate taxes. This money could be placed into savings and later used to pay off the Share Bonds when they mature. The shareowners receive more money without giving up the stock.

The Share Bond is unique in that it provides: 1) The capability for shareowners to simultaneously receive the benefits of both a bond and stock, while buying only the stock. 2) The capability for the shareowner of record to receive the benefits of the Share Bond for the price of zero. 3) No tax liability that otherwise might be incurred if one actually owned a bond since the Share Bond has only very restricted ownership that is more accurately stated as the shareowner being the receiver of benefits. 4) Stock enhancement that no other bond can since all other bonds are investment securities for raising money. 5) Exchange Share Bond that allows the corporation to re-issue stock with Share Bonds joined since this is simply a reallocation of price and the shareowners have no cost, no loss financially. 6) A dividend, interest, maturity, early redemption and substitution before principal components that allows the corporation to collect money for a bond principal, should it be required, without the shareowners paying any money. One example of the interest before principal is when the interest first generated from the Share Bond is not paid to the shareowner until the principal is met; subsequent interest payments are paid to the shareowners of record. 7) One purpose and must be joined to divisions of ownership to function.

Further objects and advantages of the invention will become apparent from a consideration of the drawings and ensuing descriptions.

LIST OF REFERENCE NUMERALS 12 stock or any divisions of ownership or equity of a business entity
14 non-investment bonds at no cost, no loss financially to any current and/or future shareowner with any principal or issue price that is zero, unpaid or paid by any means other than any current and/or future shareowners paying any money or property for the bonds
22 share bond—two or more non-investment bonds that have no cost, no loss financially to any current and/or future shareowner with any principal or issue price that is zero, unpaid or paid by any means other than any current and/or future shareowner paying any money or property for the bonds
24 two or more shares of a business entity's own stock
26 joined by a device, method, certificate, written agreement and/or an understanding with separation only on such conditions of payment of full face value of the bonds, liquidation of business entity's assets or substitution of another two or more non-investment bonds that have no cost, no loss financially to any current and/or future shareowner with any principal or issue price that is zero, unpaid or paid by any means other than any current and/or future shareowner paying any money or property for the bonds 28 share bond
102 business entity
104 predetermined collection of data
106 base computer
108 certificate
110 written agreement
112 two or more shares of business entity's own stock
114 document reproduction system
116 storage server system
118 computer terminal
120 current and/or future shareowners
122 data processing system for payment and distribution coupled with management report
202 means for entering name of sponsoring financial institution
204 means for entering name of company to issue share bonds
206 means for entering issue date
208 means for identifying bonds
210 means for entering type of stock, class and number of shares to be joined
212 means for determining number of bonds to be matched to one share of stock
214 means for entering length of bonds term of maturity
216 means for entering first two payment dates
218 means for entering designation of benefits dates and determining close out dates
220 means for entering set base interest of the bonds
222 means for entering face value and determining maturity payment
224 means for entering annual set base interest payment
226 means for entering division of set base interest payments for length of maturity
228 means for entering exchange share bond (optional)
230 means for generating and printing management report
232 means for generating and printing share bond certificate
234 means for generating, entering state name into, and printing share bond benefits agreement
236 means for transferring the joining data including management report share bond certificate and share bond benefits agreement
302 information update menu
304 information review
306 means for transferring information to another system
308 means for entering set base interest effective date and payment
310 means for recording new information to information review
312 means for entering maturity payment and effective date
314 means for entering substitution offer effective date and payment
316 means for entering early redemption effective date and payment
318 means for entering new numbers for shares of stock, share bonds and matching ratio
320 means for entering t-coupon interest rate
322 means for entering t-coupon interest payments
324 means for entering t-coupon effective date
326 means for entering dividend, interest, early redemption, or substitution before principal payment
402 means to view introduction
404 means for entering current day's date
406 means for viewing management report
408 means for entering date, bond identification, set base interest payment, T-coupon interest payment, maturity payment, early redemption payment and determining payment for the Share Bond
410 means for entering and determining a dividend, interest, maturity, early redemption or substitution before principal component (optional)
412 menu
414 means for entering list of current shareowners names and corresponding shares
416 means for determining itemized, total amount and distribution of money from share bond to each shareowner
418 means for generating and viewing statement
420 means for reproduction of payment and distribution list
422 exit

DETAILED DESCRIPTION OF THE INVENTION

Generally, the data processing system of the instant invention is for creating a method and program to enhance the stock by joining non-investment bonds to the stock with a data processing system that processes the joining, updates information while providing payment and distribution. The program employs a computer system having an input terminal for entry of predetermined collection of data from a business entity. The predetermined collection of data consists of the information necessary for joining non-investment bonds to the desired shares of that particular business entity's own stock. Information such as the number of shares of stock, type and class of stock, bond face value, interest on the bonds, term of maturity of the bonds and like particulars to get the optimium stock enhancement for the business entity.

Figure 4:
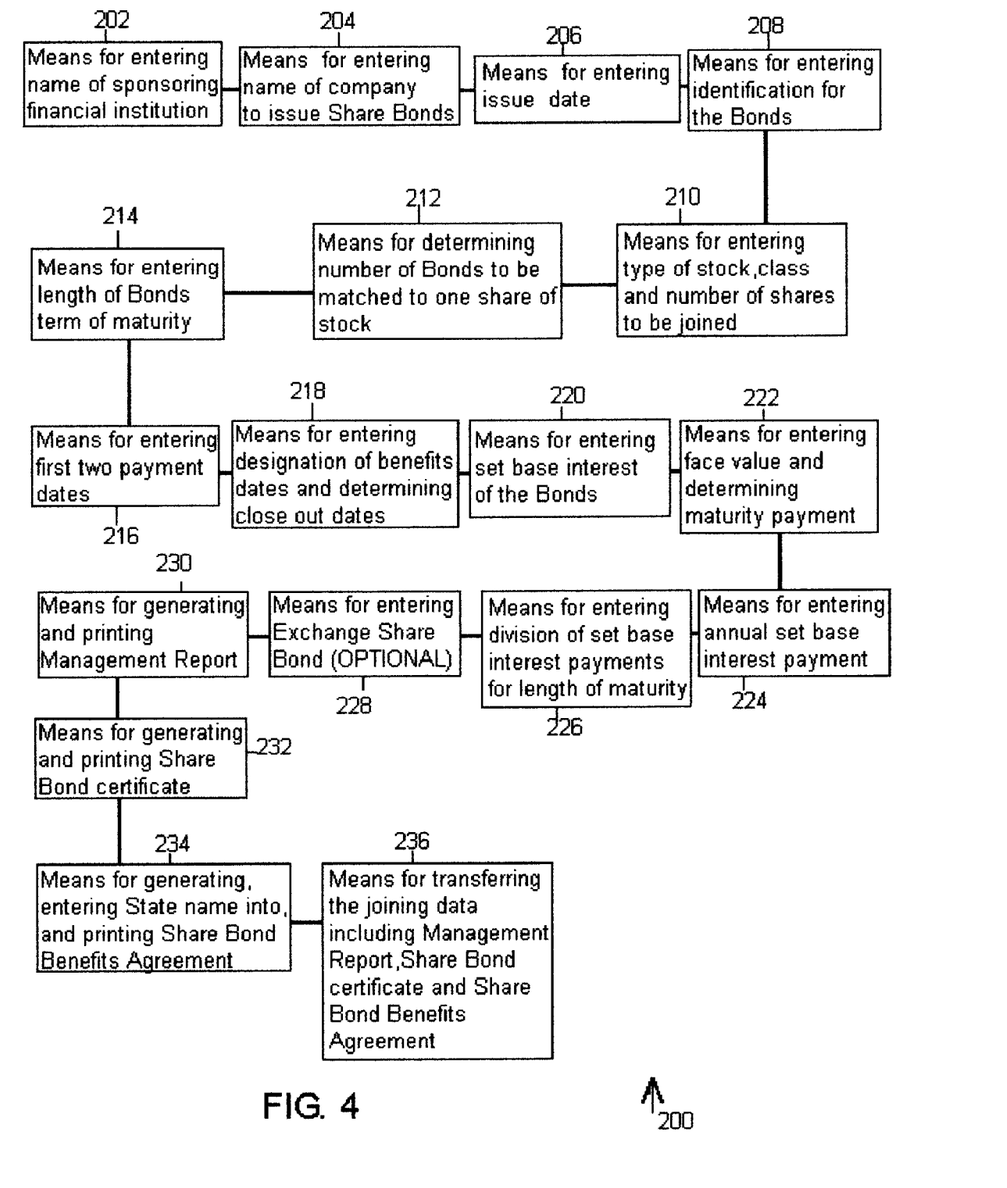
FIG. 4 is a block diagram of the data processing system of the joining portion of the invention.

The computer is based at the central offices of the financial institution sponsoring the program with network interface for it to function and perform these tasks within the system. A block diagram of the system is generally shown at 200. A means for entering name of sponsoring financial institution 202, a means for entering name of company to issue Share Bonds 204, a means for entering issue date 206, a means for entering identification for the Bonds 208, a means for entering type of stock, class and number of shares to be matched to one share of stock 212, a means for entering length of Bonds term of maturity 214, a means for entering first two payment dates 216, a means for entering designation dates and determining close out dates 218, a means for entering set base interest of the Bonds 220, a means for entering face value and determining maturity payment 222, a means for entering annual set base interest payment 224, a means entering division of set base interest payments for length of maturity 226, a means for entering Exchange Share Bond which is optional 228, a means for generating and printing Management Report 230, a means for generating and printing Share Bond certificate 232, a means for generating, entering State name into, and printing Share Bond Benefits Agreement 234, a means for transferring the joining data including Management Report, Share Bond certificate and Share Bond Benefits Agreement 236.

Figure 1:
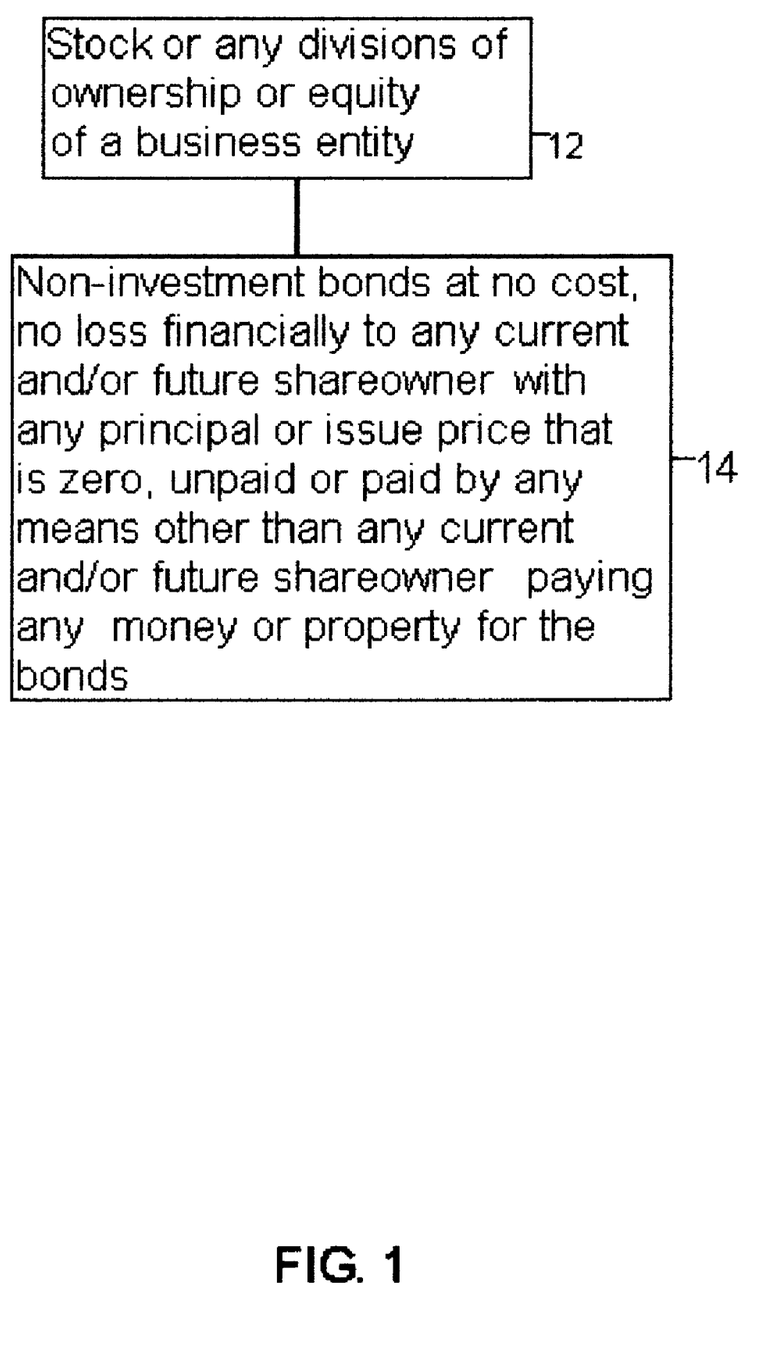
FIG. 1 is a block diagram of non-investment bonds joined to stock or any divisions of ownership or equity of a business entity.

The previous steps accomplish the task of joining non-investment bonds to stock which is depicted by reference to FIG. 1 wherein a joining is set forth. Stock or any divisions of ownership or equity of a business entity 12 is joined to non-investment bonds at no cost, no loss financially to any current and/or future shareowner with any principal or issue price that is zero, unpaid or paid by any means other than any current and/or future shareowner paying any money or property for the bonds 14.

Figure 2:
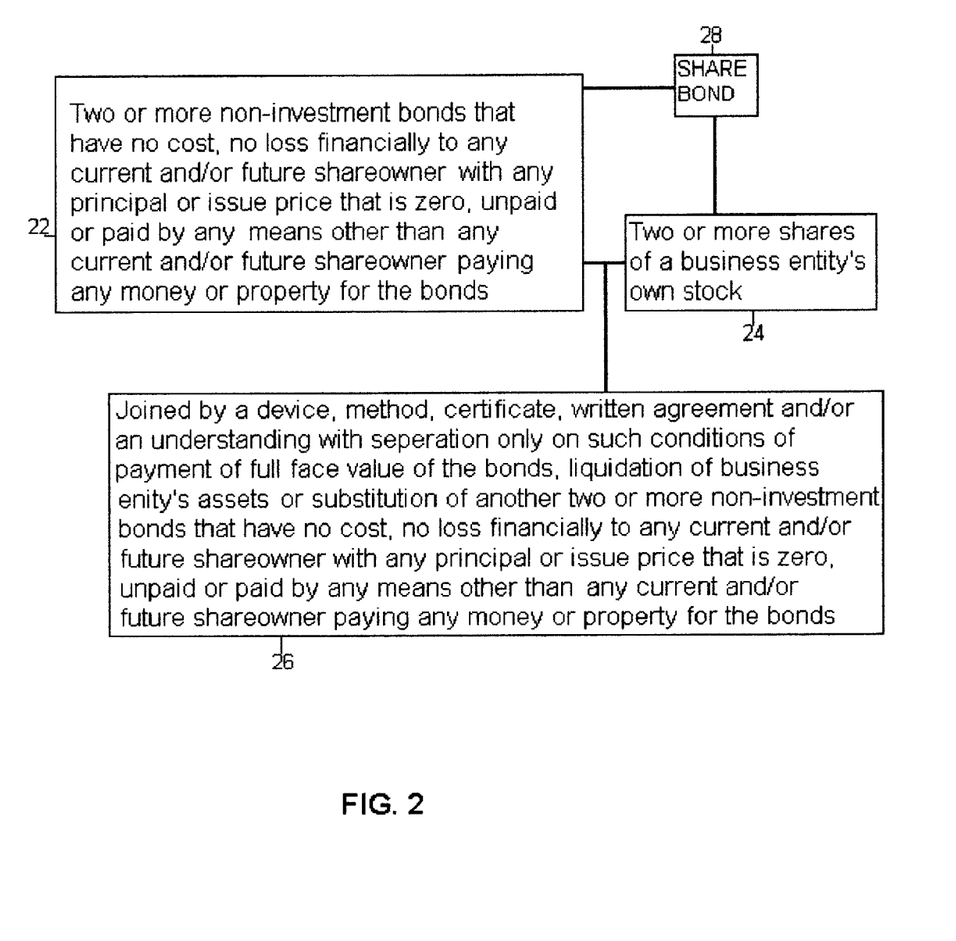
FIG. 2 is a block diagram of a Share Bond, non-investment bonds joined by a device, method, certificate, written agreement or an understanding to shares of a business entity's stock with separation only on certain conditions.

Means by which a Share Bond is joined to two or more shares of a business entity's own stock with separation on only certain conditions is depicted by reference to FIG. 2 wherein means for joining are set forth. Two or more non-investment bonds that have no cost, no loss financially to any current and/or future shareowner with any principal or issue price that is zero, unpaid or paid by any means other than any current and/or future shareowner paying any money or property for the bonds 22 and two or more shares of a business entity's own stock 24 are joined by a device, method, certificate, written agreement and/or an understanding with separation only on such conditions of payment of full face value of the bonds, liquidation of the business entity's assets or substitution of another two or more non-investment bonds that have no cost, no loss financially to any current and/or future shareowner with any principal or issue price that is zero, unpaid or paid by any means other than any current and/or future shareowner paying any money or property for the bonds 26 which forms a Share Bond 28.

The process of separation is done only when the business entity substitutes another Share Bond while possibly paying the amortized amount of the previous bond to the shareowners, selling off all assets and paying off debts including Share Bonds as long as the money is available, or the corporation redeems the Share Bonds early, or they mature. Either way the shareowner only has to own the stock and make sure the corporation knows where to send the check.

Figure 5:
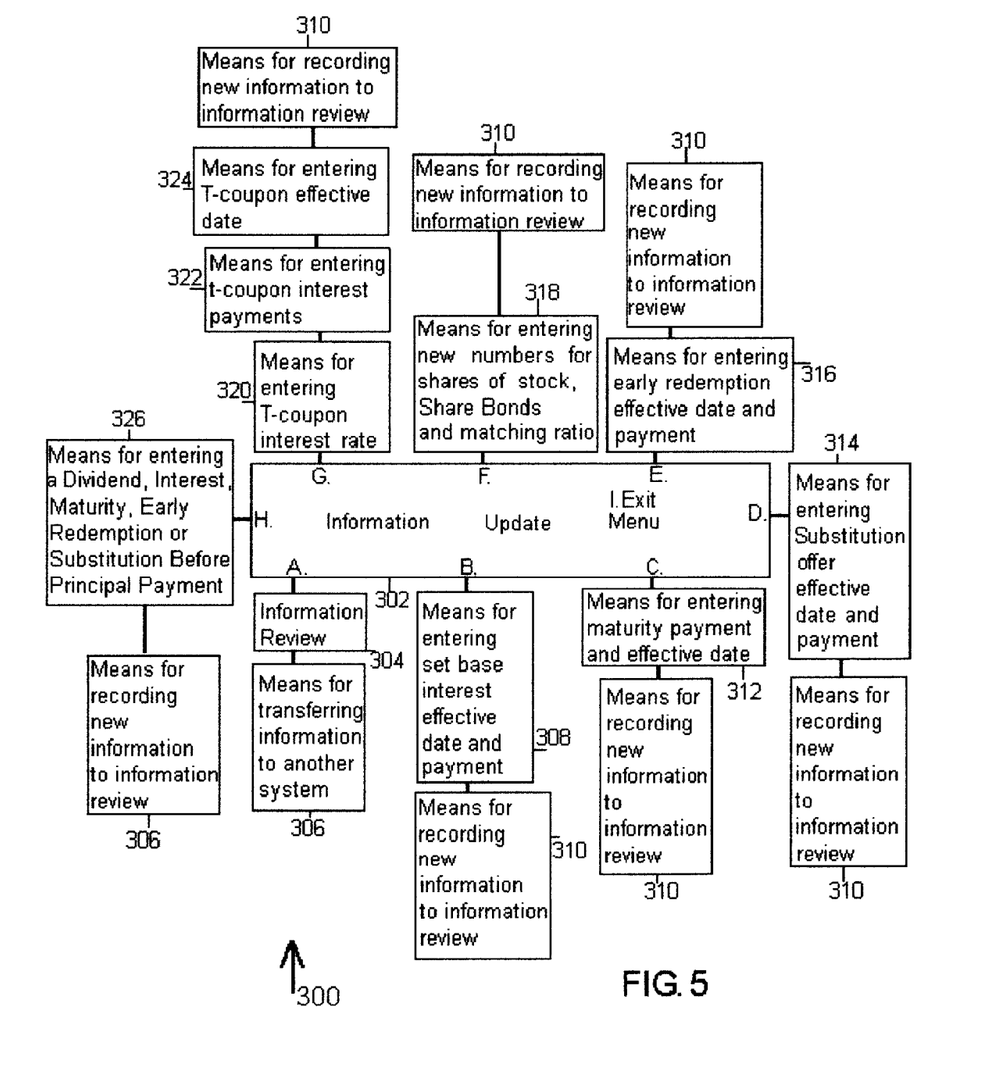
FIG. 5 is a block diagram of the data processing system of the information update portion of the invention.

The process of periodically updating information is required to maintain proper administration of the Share Bond by the data processing system. The program prompts the operator to enter the new information. The data processing system includes a number of elements to enable it to function and perform these tasks within the system. A block diagram of the system is generally shown at 300. A means for selective accessing different areas of the data processing system is presented to the operator at the information update menu 302. A means for reviewing current information is presented to the operator at the information review 304 with a means for transferring information to another system 306. From the menu 302 a means for entering set base interest effective date and payment 308, a means for recording new information to information review 310. From the menu 302 a means for entering maturity payment and effective date 312, a means for recording new information to information review 310. From the menu 302 a means for entering substitution offer effective date and payment 314, a means for recording new information to information review 310. From the menu 302 a means for entering early redemption effective date and payment 316, a means for recording new information to information review 310. From the menu 302 a means for entering new numbers for shares of stock, Share Bonds and matching ratio 318, a means for recording new information to information review 310. From the menu 302 a means for entering T-coupon interest rate 320 a means for entering T-coupon interest payments 322, a means for entering T-coupon effective date 324, a means for recording new information to information review 310. From the menu 302 a means for entering a Dividend, Interest, Maturity, Early Redemption or Substitution Before Principal Payment 326, a means for recording new information to information review 306.

Figure 6:
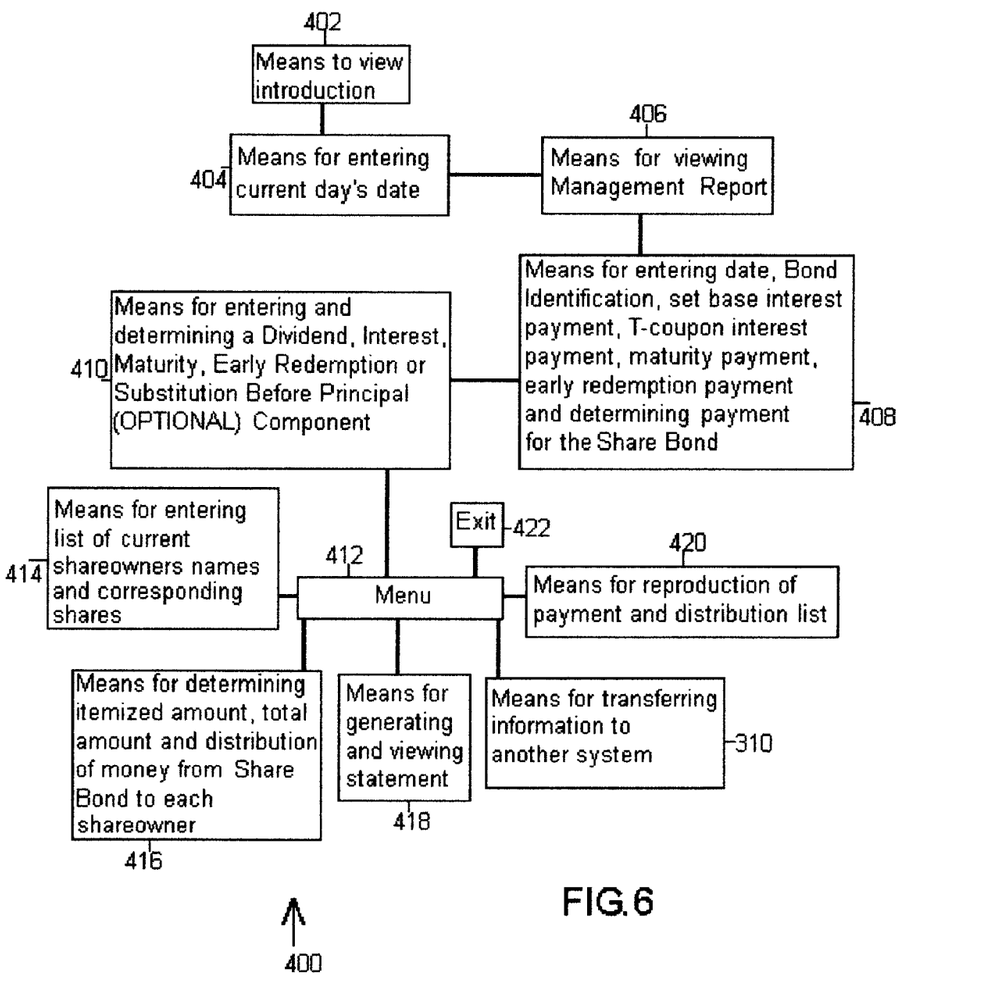
FIG. 6 is a block diagram of the data processing system of the payment and distribution portion of the invention.

The previous steps accomplish the task of periodically updating information and further steps are required to periodically process payments and distribution. The data processing system gives the name of the business entity and then prompts the operator to enter data for payment and distribution. The data processing system includes a number of elements to enable it to function and perform these tasks within the system. A block diagram of the system is generally shown at 400. A means to view introduction 402, a means for entering current day's date 404, a means for viewing Management Report 406, a means for entering date, Bond Identification, set base interest payment, T-coupon interest payment, maturity payment, early redemption payment and determining distribution payment for each Share Bond 408, a means for entering and determining a Dividend, Interest, Maturity, Early Redemption or Substitution Before Principal Component which is optional 410, a means to view and operate from a menu 412. From menu 412, a means for entering list of current shareowners names and corresponding shares 414. From menu 412, a means for determining itemized amount, total amount and distribution of money from each Share Bond to each shareowner 416. From menu 412, a means for generating and viewing statement 418. From menu 412, a means for transferring information to another system 310. From menu 412, a means for reproduction of payment and distribution list 420. From menu 412, a means to exit 422.

Figure 3:
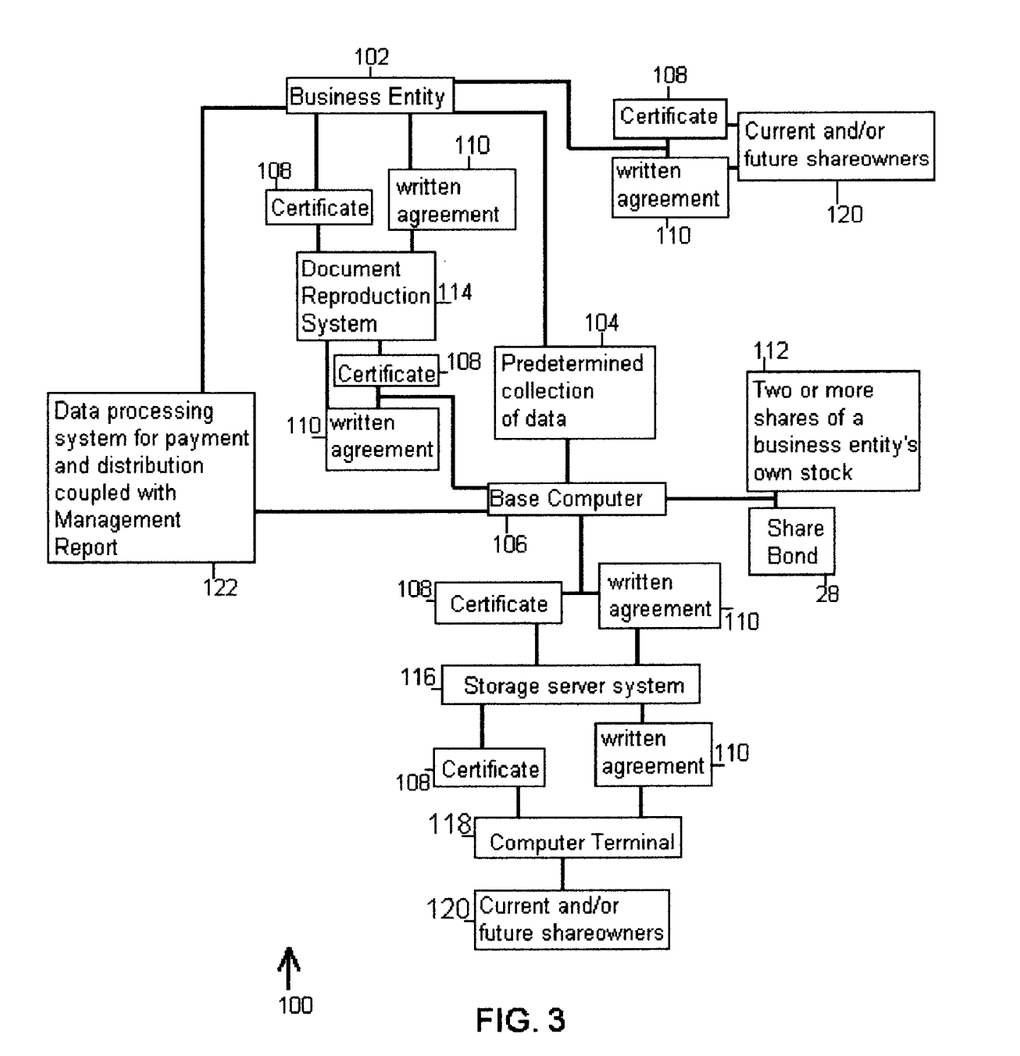
FIG. 3 is a schematic flow diagram of the external view, showing of a business entity joining non-investment bonds to a business entity's own stock (Share Bond), presenting the terms of the Share Bond to shareowners with a certificate and a written agreement while updating information, providing payment and distribution of the Share Bond benefits to the shareowners.

With the foregoing internal in mind, the external operation of the system is depicted by reference to FIG.3 wherein a schematic flow diagram 100 of the eternal operation of the system is set forth. Business entity 102 inputs predetermined collection of data 104 into the Base Computer 106 which utilizes the data processing system set forth in FIG. 4 block diagram 200 to transform the non-investment bonds 14 into a Share Bond 28 which is joined to two or more shares of a business entity's own stock 112. The Base Computer 104 outputs a certificate 108 and a written agreement 110 to a Document Reproduction System 114 and by a network interface means to a Storage server system 116.

From a Computer Terminal 118 a current and/or future shareowner 120 buys the stock and receives the certificate 108 and the written agreement 110 which sets forth the terms of the Share Bond 28. The Document Reproduction System 114 reproduces copies of the certificate 108 and the written agreement 110 on paper which is transferred to the business entity 102. The business entity 102 transfers the certificate 108 and the written agreement 110 to the appropriate shareowners at the appropriate times.

The Base Computer outputs a data processing system for payment and distribution coupled with Management Report 122 to the business entity 102. The list of shareowners with the number of shares each one owns is entered into the data processing system for payment and distribution coupled with Management Report 122. The data processing system calculates the payment and distribution to the shareowners.

One obvious embodiment of this invention is to re-issue the stock with the Share Bonds already attached. This is actually an exchange that has no cost or loss to the shareowners since the lower price on the stock is arbitrary and compensated by the bond price.

A second embodiment is to utilize other divisions of ownership such as units of a partnership, shares of a trust, franchises, subsidaries or even insurance policies.

Another embodiment is to use the Share Bond in multiples attached to a share of stock. The Share Bonds face value and interest rates are coordinated in such a way that a portion of the Share Bonds are matured in a staggered fashion. Then should the business entity elect to, they can issue new Share Bonds to replace those that have matured.

EXAMPLE

A business entity named X corporation holds a shareowner vote and elects to join Share Bonds to their one hundred million shares of common stock. The corporate management along with the sponsoring financial institution determine the best terms for the Share Bonds to best fit into the financial conditions of X corporation and it's shareowners. These terms, for the purpose of this example, are a face value of twenty dollars, one Share Bond to one share of X corporation stock, set base interest of 5% per year, two payment dates per year. June 15 and December 15; June 10 and December 10 are the Designation dates. The issue date is Apr. 9, 1998. Maturity date is Apr. 9, 2028. The set base interest is one dollar per year. Divisions of payment are fifty cents on June 15 and fifty cents on December 15. The price is zero for the shareowner.

This and other predetermined data is entered into the data processing system. One hundred million Share Bonds are joined to one hundred million shares of X corporation common stock. With a face value of twenty dollars and a guaranteed interest of 5% per year which amounts to one dollar per year, per bond, per share for thirty years. Shareowners are presented with a certificate and a written agreement that explains much of the Share Bond terms and benefits. The business entity has an understanding to pay benefits to the owner of record despite no acceptance to the terms by the shareowner.

There is no cost, no loss financially to the shareowner for the Share Bonds. Share Bonds can be joined to stock with a principal but that principal is not paid by the shareowners. Even with multiple bonds joined to the shares of stock, there is no cost to the shareowners. A corporation can afford to place many Share Bonds on one share of stock because the bond face value denominations can go as low as one penny. So these bonds can have staggered maturities if there is any problem with the amortization factor as described does not go exactly as previously outlined. The corporation can just have more smaller denomination Share Bonds and have one Share Bond mature each year. This will allow the shareowners to actually get more money, quicker than the amortization allows. So there is a great deal of flexibility to the Share Bond that can be utilized to get more money to the shareowners, thereby enhancing the stock. Reminder that the total objective of the Share Bond is to enhance the business entity's stock. The value of the stock will rise, especially at times prior to interest payments and maturity payments.

When the June 10th Designation date arrives, the company uses the payment and distribution portion of the data processing system to enter the names of the current shareowners. The number of shares each individual shareowner owns is also entered into the data processing system. Division of payment is fifty cents for this payment period. Payment is calculated by counting the number of shares owned by record and multiplying by the number of Share Bonds attached to one share of stock, in this example one; then multiplying by the division of payment, in this example fifty cents. The proper amount having been calculated, the money is then distributed to the proper shareowners. Meanwhile, the sponsoring financial institution utilizes the update information portion of the data processing system by entering the payment, then storing the updated information and generating a new, updated management report.

Since the interest paid to the shareowners is not taxed at the corporate income tax level, the shareowners are very likely to realize more money than they would under the same circumstances with just dividends on stock. Shareowners are more likely to retain ownership of the stock they already own and even perhaps buy more. Other investors will buy X corporation stock so they can realize more money. This will cause the stock price of X corporation to rise based on the law of supply and demand, where few want to sell and more want to buy. If the corporation does not have Share Bonds, such as Y corporation, then the corporation must either borrow or draw from corporation savings to pay dividends without paying the corporate taxes. So this will come to end for Y corporation when the debt gets too high or the savings become depleted. The alternative of paying the dividends to shareowners from revenues, like X corporation can do without being subject to taxes at the corporate level, will cost Y corporation dearly. Those dividends will be considered corporate profit and taxed at an approximate rate of 34% before the individual shareowner pays the capital gains tax. If Y corporation is to match X corporations one dollar per year interest, per Share Bond, for each share of X corporation stock then Y corporation must allocate one dollar and fifty cents per share, per year. Fifty cents will go to taxes and one dollar will go to the shareowners in dividends. This scenario will create a problem for Y corporation in regards to attracting investors to Y corporation stock. X corporation can pay a hundred million dollars from revenues to their shareowners in interest on the Share Bonds, but Y corporation must pay a hundred fifty million from revenue just to pay a hundred million in dividends to their shareowners. Fifty million must go to the federal government and soon Y corporation will go to Share Bonds.

The U.S. government will receive less tax revenue on the corporate income tax side but increased revenue on the individual capital gains tax side. The increase in capital gains tax revenue could grow even larger with the logical progression of corporate behavior and tax avoidance investments. With more being paid to shareowners in interest, then more capital gains taxes are paid to the U.S. government.

Corporate behavior could easily change when Share Bonds are instituted. Simply put, it becomes more difficult for a CEO to justify to shareowners the buying of an executive jet for two million dollars, or a company for twenty million dollars, when the shareowners know that the money could have gone to them The corporation can just as easily substitute new Share Bonds that pay a higher interest rate in times of higher profits. The CEO's will have to be more accountable to their own shareowners for expenditures that are unnecessary. That two million dollar jet better be necessary and that twenty million dollar company better make enough profit to justify the expenditure, or the shareowners will get another CEO who will see to it that the money reaches them.

The bottom line is that if the current tax code stays the same, or relatively the same, then all shareowners and corporations will want Share Bonds. Even if the tax code changes in order to allow dividends to be deducted out of corporate revenue before taxes are calculated, some will still prefer Share Bonds. Other reasons are the increased investment security and guaranteed payments of the Share Bonds.

While my above description contains many specificities, these should not be construed as limitations on the scope of the invention, but rather as an exemplification of one possible example thereof. Many other variations are possible, such as the T-coupon which is a temporary add-on or tack-on interest to the Share Bond set base interest. This feature pays extra interest to the shareowners should a corporation experience a windfall profit one year without committing to the extra interest over the life of the bond.

If a corporation liquidates and begins to sell off assests to pay debts, the shareowners of the corporation would probably get nothing. If they had Share Bonds, they could recover all or part of their Share Bonds face value; this being dependent on the assets versus debts and whether the Share Bonds are categorized by the corporation as senior debt or subordinated debt.

Since the Share Bond is a new invention and has operations, features and components that have not yet been placed into application in the real financial world, the ramifications cannot be known in some cases with absolute certainty. While such things as guaranteed interest payments and investment security are known, the non-stock enhancement amortization aspect of the Share Bond is not so clearly defined or known. The fact is that in the tax code the references made to bond amortization concern corporate bonds with a premium. The Share Bond at it's optimium will have no principal, even though an Interest Before Principal Component is a feature of the Share Bond and can be utilized should the need arise. The research acquired thus far suggests that there would be an amortization of the bond face value since this is the amount that is also debt and must be paid to the shareowners on maturity.

The interest from the Share Bond, while more clearly defined and known than the amortization of the Share Bond, is still subject to tax law changes or I.R.S. rulings that cannot be foreseen. Based on the information and research acquired thus far strongly suggests that the Share Bond interest will be deducted from the corporate revenue before the corporate income taxes are applied against the corporate profits. This makes the interest tax deductible at the corporate level but subject to individual capital gains taxes. The corporation is allowed to pay money in interest on Share Bonds that would normally be paid in taxes or spent to avoid taxes.

The invention not only benefits the shareowner but also the business entity or company that joins Share Bonds to its own stock if the company is able to amortize the cumulative Share Bond face value. The company will be able to draw interest off some of its profits until the bonds mature. This is bonus revenue to the company without having any cost. This aspect, as stated before, is not entirely clear but it does appear that the company's stock should increase in price automatically. The company can benefit from a higher stock price by selling fewer shares for more money than before Share Bonds. They could also issue more of these new, more valuable shares to trade for shares and ownership of another company. This way the company uses the shares of stock instead of cash. The company might mix in some cash in the trade but far less than if stock without Share Bonds is used. They will also have to issue less stock because Share Bond stock will have a higher market value than would non-Share Bond stock. With less shares being issued, the company can distribute future dividends and Share Bond interest over fewer shares, More revenue per share, coupled with more funds from the new company, leads to more stock enhancement. Without Share Bonds this acquistion may not have been possible. The value of Share Bonds may not be in terms of cash for the company, but the potential exists.

Whether the Share Bonds are classified as senior debt or subordinated debt is the choice of the company. Senior debt with a high face value appears to be the best stock enhancement. However, the company must factor in the debt to equity ratio and other factors so an unbearable debt is not assumed.

The Share Bond does not in anyway, or at any time, convert into stock. While it is joined, attached or matched to a share of stock, it is a separate and distinct debt instrument. Regardless of what the share does in terms of price changes, dividends or voting rights, the Share Bond face value, set base interest rate, specified date of payment and criteria for receiver of benefits, remain fixed. The debtor-creditor relationship has been established with the shareowner of record and the promise to pay. This relationship is unchanged unless there is a substitution offer or early redemption or maturity of the Share Bonds, which will entitle the shareowners to benefits from a new Share Bond or a payment of money equivalent to the cumulative Share Bonds face value.

Accordingly, the scope of the invention should not be limited by the embodiment(s), ramification(s), or example(s) illustrated, but encompassed by the appended claims and their legal equivalents.

What is claimed is:

1. A computer system including computer readable program code stored in computer readable memory for calculating the payment amount of the sum certain in money a business entity promises to pay and the payment amount of the interest from any debt instrument of said business entity that is tax deductible to said business entity, whereby the right to the sum certain in money said business entity promises to pay and the right to the interest from said debt instrument of said business entity is issued or delivered to a share or shares of equity of said business entity, whereby said debt instrument of said business entity cannot be owned by the shareowner of equity of said business entity, whereby said debt instrument of said business entity cannot be separated from said share or shares of equity of said business entity to be sold or traded separate from said share or shares of equity of said business entity, whereby said debt instrument is issued or delivered to said share or shares of equity of said business entity and the shareowner or shareowners of said share or shares of equity of said business entity exchange no money or property for said debt instrument of said business entity:

a computer system having a memory means for mathematical calculation;

a number representing the amount of the sum certain in money said business entity promises to pay or a number representing the amount of the interest from said debt instrument of said business entity;

a number or list of numbers representing the number of shares of equity owned by the shareowner or shareowners of record of said business entity;

a data input means for entering said number representing the amount of the sum certain in money said business entity promises to pay or said number representing the amount of the interest from said debt instrument of said business entity and entering said number or list of numbers representing the number of shares of equity owned by the shareowner or shareowners of record of said business entity;

said computer readable code including means for causing said computer system to multiply said number representing the amount of the sum certain in money said business entity promises to pay or said number representing the amount of the interest from said debt instrument of said business entity by the said number or list of numbers representing the number of shares of equity owned by the shareowner or shareowners of record of said business entity;

a data output means for generating a totalized payment amount of the sum certain in money said business entity promises to pay or said totalized payment amount of the interest from said debt instrument of said business entity to the shareowner or shareowners of record of said business entity.

2. The system of claim 1 further comprising, said debt instrument that directly enhances the value of said share or shares of equity of said business entity, whereby said business entity receives in return adequate consideration in the form of enhancement of the equity of said business entity.

3. A computer system including computer readable memory for administering a program to provide storage to a removable storage apparatus or said computer system of a written agreement or document, whereby a business entity conveys, issues or delivers the right to the sum certain in money said business entity promises to pay on a specified date and the right to the interest from any debt instrument of said business entity to a share or shares of equity of said business entity, whereby said debt instrument of said business entity is issued or delivered to said share or shares of equity of said business entity, whereby said debt instrument cannot be separated from said share or shares of equity of said business entity to be sold or traded separate from said share or shares of equity of said business entity, whereby the shareowner or shareowners of said share or shares of equity of said business entity exchange no money or property for said debt instrument of said business entity, whereby said debt instrument cannot be owned by the shareowner or shareowners of equity of said business entity and the interest from said debt instrument of said business entity is tax deductible to said business entity;

said removable apparatus or said computer system having a memory means;

said written agreement or document whereby said business entity conveys, issues or delivers the right to the sum certain in money said business entity promises to pay and the right to the interest from said debt instrument of said business entity to said share or shares of equity of said business entity, whereby said debt instrument of said business entity is issued or delivered to said share or shares of equity of said business entity, whereby said debt instrument cannot be separated from said share or shares of equity of said business entity to be sold or traded separate from said share or shares of equity of said business entity, whereby the shareowner or shareowners of said share or shares of equity of said business entity exchange no money or property for said debt instrument of said business entity, whereby said debt instrument cannot be owned by the shareowner or shareowners of said share or shares of equity of said business entity and the interest from said debt instrument of said business entity is tax deductible to said business entity;

said computer readable program code including means for causing said removable storage apparatus or said computer system having said memory means to store said written agreement or document, whereby said business entity conveys, issues or delivers the right to the sum certain in money said business entity promises to pay on a specified date and the right to the interest from said debt instrument of said business entity to said share or shares of equity of said business entity, whereby said debt instrument of said business entity is issued or delivered to said share or shares of equity of said business entity, whereby said debt instrument cannot be separated from said share or shares of equity of said business entity to be sold or trade separate from said share or shares of equity of said business entity, whereby the shareowner or shareowners of said share or shares of equity of said business entity exchange no money or property for said debt instrument of said business entity, whereby said debt instrument cannot be owned by the shareowner or shareowners of said share or shares of equity of said business entity and the interest from said debt instrument of said business entity is tax deductible to said business entity.

4. The system of claim 3 further comprising, said debt instrument that directly enhances the value of said share or shares of equity of said business entity, whereby said business entity receives in return adequate consideration in the form of enhancement of the equity of said business entity.

5. A computer system including computer readable memory for matching the totalized payment amount of the sum certain in money a business entity promises to pay and matching the totalized amount of the interest from any debt instrument of said business entity to a name or list of names representing the shareowner or shareowners of record of a shares or shares of equity of said business entity, whereby the payment amount of the interest from said debt instrument of said business entity is tax deductible for said business entity, whereby the right to the sum certain in money said business entity promises to pay and the right to the interest from said debt instrument is issued or delivered to a share or shares of equity of said business entity, whereby said debt instrument cannot be separated from said share or shares of equity of said business entity to be sold or traded separate from said share or shares of equity of said business entity, whereby said debt instrument cannot be owned by the shareowner or shareowners of said share or shares of equity of said business entity;

a computer system having a memory means with a matching capability;

a number representing the totalized amount of the sum certain in money said business entity promises to pay or a number representing the totalized amount of the interest from said debt instrument;

a name or list of names representing the shareowners of record of said business entity;

a data input means for entering said number representing the totalized amount of the sum certain in money said business entity promises to pay or a number representing the totalized amount of the interest from said debt instrument;

said computer readable code including means for causing said computer system to match said number representing the totalized amount of the sum certain in money said business entity promise to pay or to match said number representing the totalized amount of the interest from said debt instrument of said business entity to said name or list of names representing the shareowner or shareowners of record of said business entity;

a data output means for generating the totalized payment of the sum certain in money said business entity promises to pay matched to the correct said name or list of names representing the shareowner or shareowners of record of said business entity and for generating the totalized payment of the interest from said debt instrument matched to the correct said number or list of names representing the shareowner or shareowners of record of said business entity.

* * * * *